UNITED STATES PATENT OFFICE.

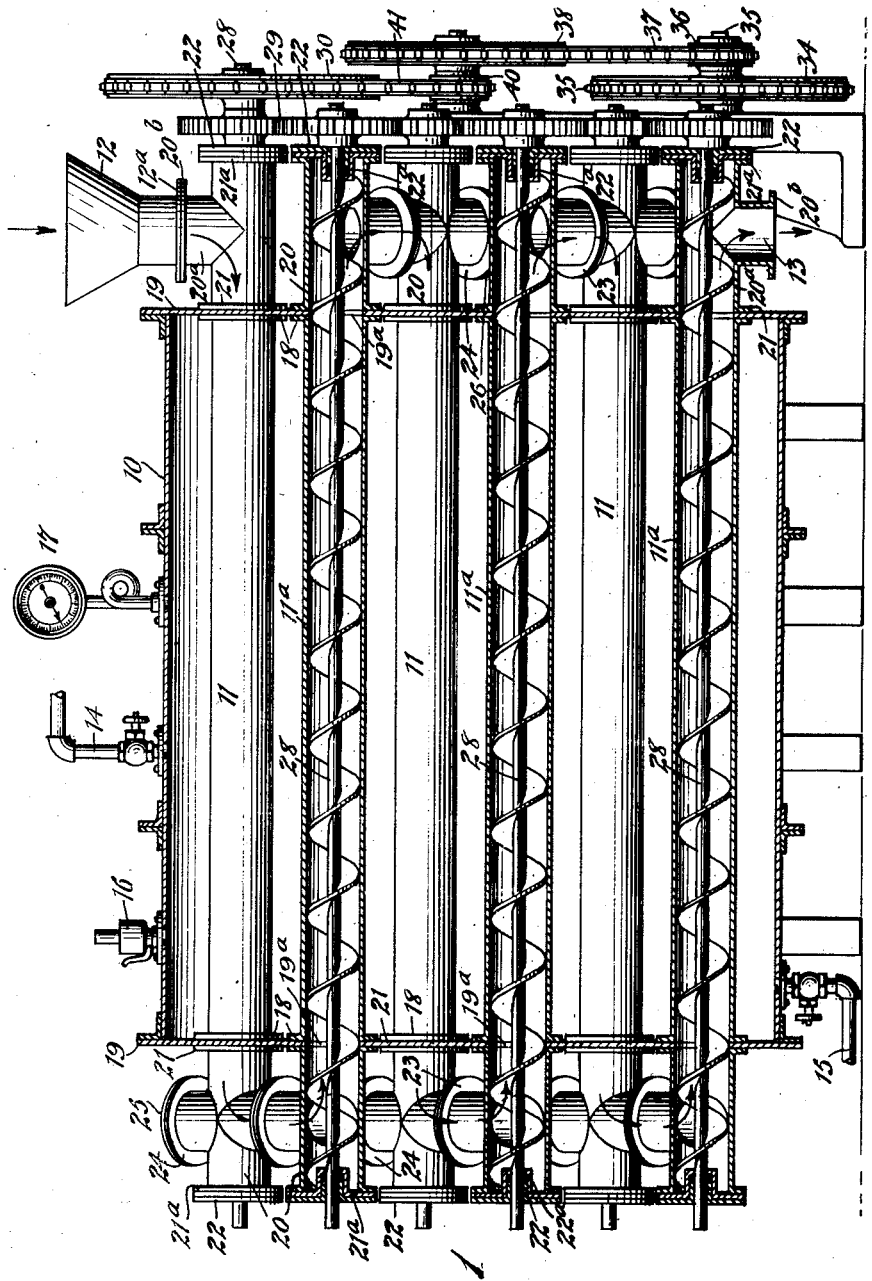

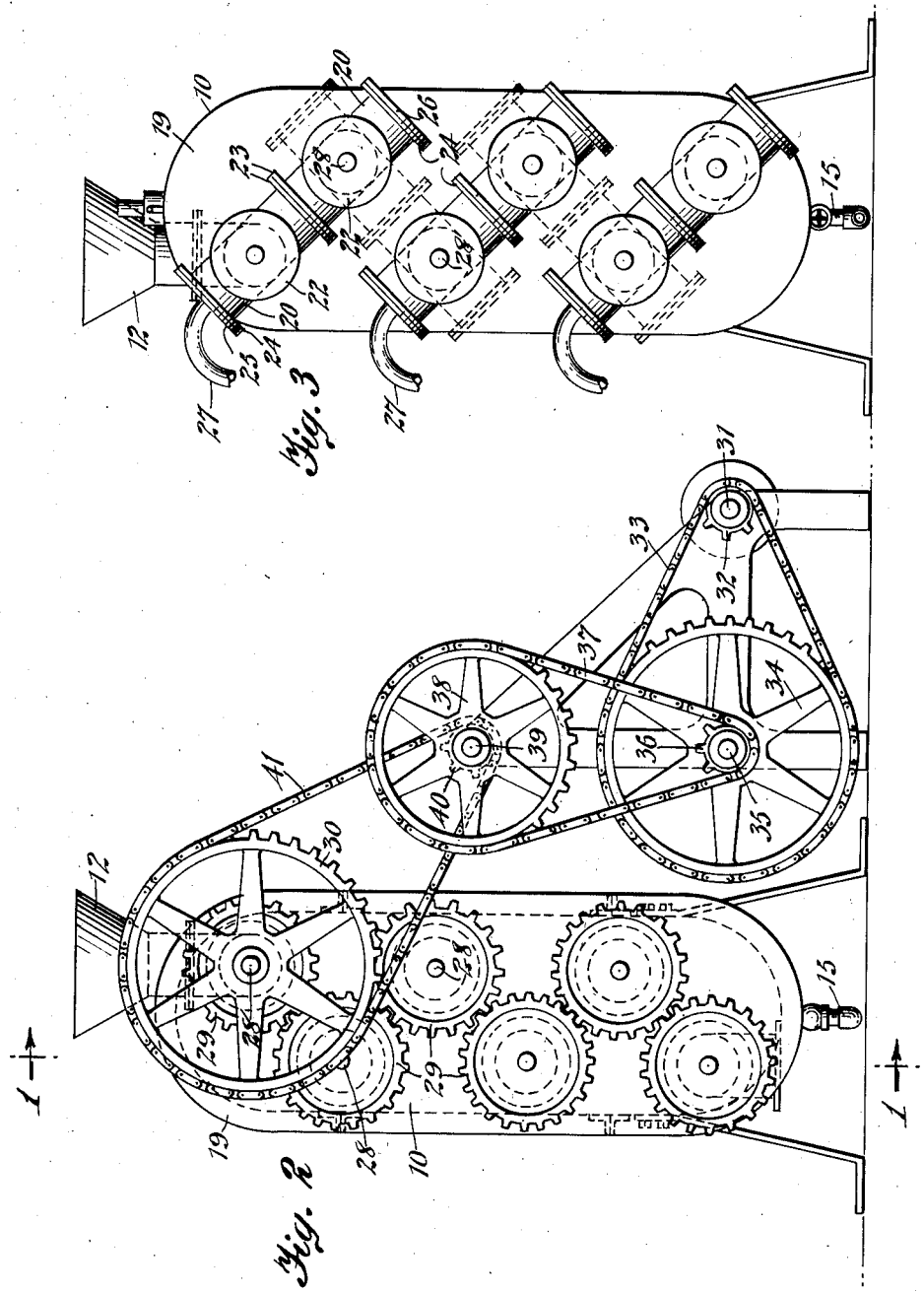

ARTURO BARRA, OF MANILA, PHILIPPINE ISLANDS.

COPRA-COOKER.

1,374,873.  Specification of Letters Patent.  Patented Apr. 12, 1921.

Application filed September 24, 1919. Serial No. 326,097.

*To all whom it may concern:*

Be it known that I, ARTURO BARRA, a citizen of Spain, and a resident of Manila, Philippine Islands, have invented a new and Improved Copra-Cooker, of which the following is a description.

My invention relates to a cooker, and while capable of other uses is more particularly intended for use in cooking copra, which is the dried kernel of the cocoanut, the cooking being preparatory to the extraction of the oil.

The general object of my invention is to provide a new and improved cooker of the indicated character in which the cooking can be effected in the shortest possible time; to provide an apparatus of great compactness for a given capacity; to provide for effecting the cooking with the minimum handling of the material; and to provide an embodiment of the invention reflecting important considerations with respect to facilitating the assemblage and installation of the cooker as well as with respect to facilitating the partial or complete disassembling of the apparatus for the purpose of cleaning, repair or otherwise.

Reference is to be had to the accompanying drawings forming a part of this specification, it being understood that the drawings are merely illustrative of one example of the invention.

Figure 1 is a longitudinal vertical section on the line 1—1, Fig. 2;

Fig. 2 is an end view; and

Fig. 3 is a view of the opposite end.

In carrying out my invention in accordance with the illustrated example a box 10 is provided, adapted to receive steam or other cooking fluid and ranging longitudinally of said box at the interior are cooking tubes 11, 11$^a$. Said steam box 10 preferably is long and narrow and said cooking tubes 11, 11$^a$ being advantageously arranged in two vertical series, the tubes of the respective series being in staggered relation, the described arrangement making for compactness. The tubes are alternately connected at their opposite ends to form a continuous zig-zag passage through which the material is carried while being cooked, means being provided so that said material is advanced progressively through successive tubes 11, 11$^a$, to pass alternately through the tubes of the respective series as hereinafter described. The uppermost tube of one series is provided with a supply means which may be as shown in the form of a hopper 12 to receive the material to be cooked and the last or lowermost tube is provided with an outlet 13 for the discharge of the cooked material, from which outlet the cooked material may be conducted or carried in any suitable manner to the oil-extracting apparatus (not shown). The steam box is provided with a valved steam inlet pipe 14 at the top supplied by any suitable source of steam (not shown), the bottom of the steam box having a valved steam outlet 15. The numeral 16 indicates a safety valve conventionally shown and 17 a pressure gage on the steam box.

The cooking tubes are provided at their ends with annular flanges 18 which are secured by any suitable means to the heads 19 of the steam box 10 at the inner sides of said heads and said cooking tubes have extensions 20, 20$^a$ beyond the heads 19 of the steam box, said extensions being for the main part in the nature of four-way or cruci-form fittings, those fittings at the inlet and outlet being three-way. Each extension fitting has at one end a flange 21, suitably secured to the heads 19 at the outer sides of the latter, the said heads being thus clamped between the flanges 18, 21 and presenting openings 19$^a$ so that the extensions 20, 20$^a$ freely communicate with the bodies of the cooking tubes 11, 11$^a$ for the passage of the material through the bodies of the tubes and through the extensions. That end of the extension fittings 20 or 20$^a$ directly opposite the flange 21 is provided with a flange 21$^a$ for receiving a head 22 for closing the outer end of the cooking tube. The extension fittings 20 form also the means for establishing communication between adjacent tubes alternately at opposite ends of the cooker. For the purpose, adjacent extensions 20 have at their opposed ends flanges 23 for connecting the adjacent extensions so that the material passes forwardly through one tube 11 and returns through an adjacent tube 11$^a$ to the opposite end of the cooker. Thus, two connected extension fittings 20$^a$ provide an end tube connecting the longitudinal tubes and said end tubes are disposed obliquely in parallel relation as clearly seen in Fig. 3. The upper and lower ends of the end tubes thus provided present flanges 24 to receive respectively upper and lower heads 25, 26 closing the end tubes, The upper ends of the end tubes have siphons 27 leading through the heads 25 from the interior of the end tubes for the escape of the limited quantity of steam that may form and condense in the cooking tubes and their extensions. The inlet fitting 20$^a$ is flanged as at 20$^b$ to receive the flange 12$^a$ of a hopper 12 and the discharge fitting 20$^a$ has at the end of the outlet 13 a flange 20$^b$ to receive any connecting pipe (not shown) for carrying away the cooked material. Thus, it will be seen that the identical form of fitting 20$^a$ is employed for the inlet and outlet.

Extending longitudinally in the tubes 11 and 11$^a$ and their extensions 20 are conveyer screws 28, the ends of which turn in bearings afforded by the heads 22 in connection with which stuffing boxes 22$^a$ are provided. For turning the screws 28 for the respective series of cooking tubes in the proper directions, intermeshing gears 29 are provided on the screws 28 at one end so that the driving of one of said gears will cause all to turn and in proper directions. On the end of one screw 28 a drive gear 30 is also secured on said gear and driven from the drive shaft 31 which may be actuated from any convenient source of power (not shown). The wheel 30 is actuated in the present example through a system of chain-driven reducing gears. Thus, on the drive shaft 31 is a small pinion 32. A belt 33 runs about said pinion and about a large wheel 34 on an adjacent shaft 35. The shaft 35 in turn has a small pinion 36 thereon about which a chain 37 runs, said chain running also about a large wheel 38 on a shaft 39 having a small pinion 40 over which a chain 41 runs, said chain running about the driven wheel 30 on its shaft 28.

With the described arrangement screws 28 are caused to turn through the described drive means and the uncooked material is fed to the cooker through the medium of the hopper 12 so that the material will be moved back and forth in the cooker through the respective tubes 11 and their extensions. The speed of the conveyer screws is such that the material is carried through the apparatus in a period of twenty-five to thirty minutes, which suffices to completely prepare the material for the oil-extracting operation. It will be readily understood that the staggered relation of the cooker tubes and their intermeshing gears with the oblique connecting tubes at the ends make for substantial compactness of the apparatus.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. A cooker of the class described including a steam box, a plurality of cooking tubes in said box, the first tube having an inlet for material to be cooked, and the last tube having an outlet, and four-way fittings on the ends of the tubes other than at the inlet and outlet, outside of the closed ends of the box, one member of each of said fittings being in communication with a cooking tube so that the fitting constitutes an extension of the tube, the opposed members of adjacent fittings being connected to form tubular connections between the extensions alternately at opposite ends of the cooker for the passage of the material to successive tubes.

2. A cooker of the class described including a steam box, a plurality of cooking tubes in said box, the first tube having an inlet for material to be cooked, and the last tube having an outlet, and four-way fittings on the ends of the tubes other than at the inlet and outlet, outside of the closed ends of the box, one member of each of said fittings being in communication with a cooking tube so that the fitting constitutes an extension of the tube, the opposed members of adjacent fittings being connected to form tubular connections between the extensions alternately at opposite ends of the cooker for the passage of the material to successive tubes, the remaining tube members of each fitting having detachable closures.

3. A cooker of the class described including a steam box, a plurality of cooking tubes in said box, the first tube affording an inlet for the material to be cooked, and the last tube affording an outlet, and fittings on the ends of the tubes outside of the closed ends of the box, said fittings except those at said inlet and outlet each presenting a member in communication with a cooking tube so that the fitting constitutes an extension of the tube, and adjacent fittings presenting opposed members detachably united to form tubular connections between the extensions alternately at opposite ends of the cooker for the passage of the material to successive tubes.

ARTURO BARRA.